US011086925B2

(12) United States Patent
Rekhi et al.

(10) Patent No.: US 11,086,925 B2
(45) Date of Patent: Aug. 10, 2021

(54) FASHION BY TREND USER INTERFACES

(71) Applicant: eBay Inc., San Jose, CA (US)

(72) Inventors: Ashmeet Singh Rekhi, Campbell, CA (US); Shane Lin, Mountain View, CA (US); Suchitra Ramesh, San Jose, CA (US); An Feng-I Chen, Fremont, CA (US); Padmapriya Gudipati, San Jose, CA (US); Justin Nicholas House, San Jose, CA (US); Kenneth Crookston, Mlada Boleslav (CZ); John Weigel, San Jose, CA (US); Timothy Keefer, San Jose, CA (US); Satya Krishna Suman Voleti, Milpitas, CA (US); Zhe Sun, San Jose, CA (US)

(73) Assignee: eBay Inc., San Jose, CA (US)

( * ) Notice: Subject to any disclaimer, the term of this patent is extended or adjusted under 35 U.S.C. 154(b) by 73 days.

(21) Appl. No.: 16/140,305

(22) Filed: Sep. 24, 2018

(65) Prior Publication Data

US 2020/0097568 A1  Mar. 26, 2020

(51) Int. Cl.
*G06F 16/00* (2019.01)
*G06F 16/583* (2019.01)
(Continued)

(52) U.S. Cl.
CPC ............ *G06F 16/583* (2019.01); *G06F 16/29* (2019.01); *G06F 16/9537* (2019.01); *G06Q 30/0641* (2013.01)

(58) Field of Classification Search
CPC combination set(s) only.
See application file for complete search history.

(56) References Cited

U.S. PATENT DOCUMENTS

| 8,737,728 B2 * | 5/2014 | Bhardwaj | G06K 9/66 |
| | | | 382/165 |
| 9,886,653 B2 * | 2/2018 | Bhardwaj | G06F 16/532 |

(Continued)

FOREIGN PATENT DOCUMENTS

| KR | 10-2015-0110840 A | 10/2015 |
| KR | 10-2016-0013496 A | 2/2016 |

(Continued)

OTHER PUBLICATIONS

International Search Report received for PCT Patent Application No. PCT/US2019/040295, dated Nov. 14, 2019, 4 pages.

(Continued)

*Primary Examiner* — Farhan M Syed
(74) *Attorney, Agent, or Firm* — Schwegman Lundberg & Woessner, P.A.

(57) ABSTRACT

Systems and methods for improving a search process are provided. A networked system accesses, from online sources, fashion trend information including pictures illustrating fashion trends. The networked system determines a plurality of top fashion trends, and extracts, using an image detection algorithm, images of fashion items from a picture associated with each of the top fashion trends. Using the extracted images, the networked system performs an image search for matching inventory items. The networked system then generates and stored a plurality of fashion trend user interfaces, whereby the plurality of fashion trend user interfaces each comprise selectable elements that represent the plurality of top fashion trends. At runtime, the networked system receives an indication to initiate a search for fashion by trends, and in response, accesses the plurality of stored fashion trend user interfaces. One of the plurality of stored fashion trend user interfaces is presented on a user device.

20 Claims, 10 Drawing Sheets

(51) Int. Cl.
*G06Q 30/06* (2012.01)
*G06F 16/29* (2019.01)
*G06F 16/9537* (2019.01)

(56) References Cited

U.S. PATENT DOCUMENTS

| | | | |
|---|---|---|---|
| 10,007,690 B2* | 6/2018 | Finkler | G06F 16/2272 |
| 10,185,899 B2* | 1/2019 | Bhardwaj | G06K 9/6215 |
| 10,331,657 B1* | 6/2019 | Cole | G06F 16/901 |
| 10,332,176 B2* | 6/2019 | Gadre | G06Q 30/0623 |
| 10,489,692 B2* | 11/2019 | Bhardwaj | G06F 16/9535 |
| 10,575,127 B1 | 2/2020 | Ballot et al. | |
| 10,740,660 B2* | 8/2020 | Bhardwaj | G06F 16/583 |
| 10,902,506 B2 | 1/2021 | Nguyen et al. | |
| 2003/0177072 A1 | 9/2003 | Bared | |
| 2004/0153370 A1 | 8/2004 | Yang | |
| 2007/0294127 A1 | 12/2007 | Zivov | |
| 2009/0287596 A1 | 11/2009 | Torrenegra | |
| 2012/0116917 A1 | 5/2012 | Saul et al. | |
| 2013/0083999 A1* | 4/2013 | Bhardwaj | G06K 9/4652 |
| | | | 382/165 |
| 2013/0084000 A1* | 4/2013 | Bhardwaj | G06K 9/4652 |
| | | | 382/165 |
| 2015/0058079 A1 | 2/2015 | Freund et al. | |
| 2015/0058083 A1* | 2/2015 | Herrero | G06Q 30/0643 |
| | | | 705/7.32 |
| 2015/0186977 A1 | 7/2015 | Leonard et al. | |
| 2015/0227972 A1* | 8/2015 | Tang | G06Q 30/0255 |
| | | | 705/14.53 |
| 2016/0063588 A1* | 3/2016 | Gadre | G06F 16/9537 |
| | | | 705/26.61 |
| 2016/0092484 A1* | 3/2016 | Finkler | G06F 16/258 |
| | | | 707/715 |
| 2016/0224532 A1* | 8/2016 | Miller | G06F 16/22 |
| 2016/0328432 A1* | 11/2016 | Raghunathan | G06F 16/2264 |
| 2017/0169535 A1 | 6/2017 | Tolkin et al. | |
| 2017/0186066 A1* | 6/2017 | Bruch | G06Q 30/0623 |
| 2017/0323185 A1* | 11/2017 | Bhardwaj | G06F 16/9535 |
| 2017/0330144 A1 | 11/2017 | Wakim et al. | |
| 2018/0089188 A1* | 3/2018 | Kharisma | G06F 16/2477 |
| 2018/0089289 A1* | 3/2018 | Zhang | G06F 16/2462 |
| 2018/0101917 A1 | 4/2018 | Fujita | |
| 2019/0114515 A1* | 4/2019 | Bhardwaj | G06K 9/4642 |
| 2019/0155802 A1* | 5/2019 | Miller | G06F 16/3334 |
| 2019/0155803 A1* | 5/2019 | Miller | G06F 16/26 |
| 2019/0266654 A1* | 8/2019 | Gadre | G06Q 30/0643 |
| 2020/0082462 A1 | 3/2020 | Nguyen et al. | |
| 2020/0387763 A1* | 12/2020 | Bhardwaj | G06K 9/4642 |

FOREIGN PATENT DOCUMENTS

| | | |
|---|---|---|
| WO | 2016/012741 A1 | 1/2016 |
| WO | 2020/055502 A1 | 3/2020 |
| WO | 2020/068241 A1 | 4/2020 |

OTHER PUBLICATIONS

Written Opinion received for PCT Patent Application No. PCT/US2019/040295, dated Nov. 14, 2019, 7 pages.
International Search Report received for PCT Patent Application No. PCT/US2019/041108, dated Nov. 27, 2019, 3 pages.
Written Opinion received for PCT Patent Application No. PCT/US2019/041108, dated Nov. 27, 2019, 6 pages.
Non-Final Office Action received for U.S. Appl. No. 16/128,026, dated Jul. 8, 2020, 11 pages.
Applicant Interview summary received for U.S. Appl. No. 16/128,026 dated Aug. 12, 2020, 3 pages.
Notice of Allowance received for U.S. Appl. No. 16/128,026, dated Sep. 21, 2020, 7 Pages.
Response to Non-Final Office Action filed on Sep. 11, 2020 for U.S. Appl. No. 16/128,026, dated Jul. 8, 2020, 16 pages.
U.S. Appl. No. 17/136,602, filed Dec. 29, 2020, Crowd Sourcing Locations for Seller Privacy.
International Preliminary Report on Patentability Received for PCT Patent Application No. PCT/US2019/040295, dated Apr. 1, 2021, 9 Pages.
International Preliminary report received for PCT Patent Application No. PCT/US2019/041108, dated Mar. 25, 2021, 8 Pages.

* cited by examiner

US 11,086,925 B2

FASHION BY TREND USER INTERFACES

TECHNICAL FIELD

The subject matter disclosed herein generally relates to machines configured to generate and present user interfaces, and to technologies by which such special-purpose machines become improved compared to other machines that generate and present user interfaces. Specifically, the present disclosure addresses systems and methods to curate fashion trend information and available inventory to create fashion trend user interfaces that are cached for immediate display when requested.

BACKGROUND

Conventionally, a user can go online and search fashion blogs, magazines, or social media (e.g., Pinterest, Instagram) for fashion ideas. However, once the user finds an outfit or article(s) of clothing the user is interested in, the user does not know where to obtain the outfit or article(s) of clothing. Additionally, the user may not know what the individual pieces of clothing are called, a brand of a piece of clothing, or an associated color in order to search for the piece of clothing. If the user attempts to perform searches online, the user is typically forced to visit numerous sites in an attempt to find the same or similar article(s) of clothing.

BRIEF DESCRIPTION OF DRAWINGS

Various ones of the appended drawings merely illustrate example embodiments of the present invention and cannot be considered as limiting its scope.

DETAILED DESCRIPTION

Figure 1:
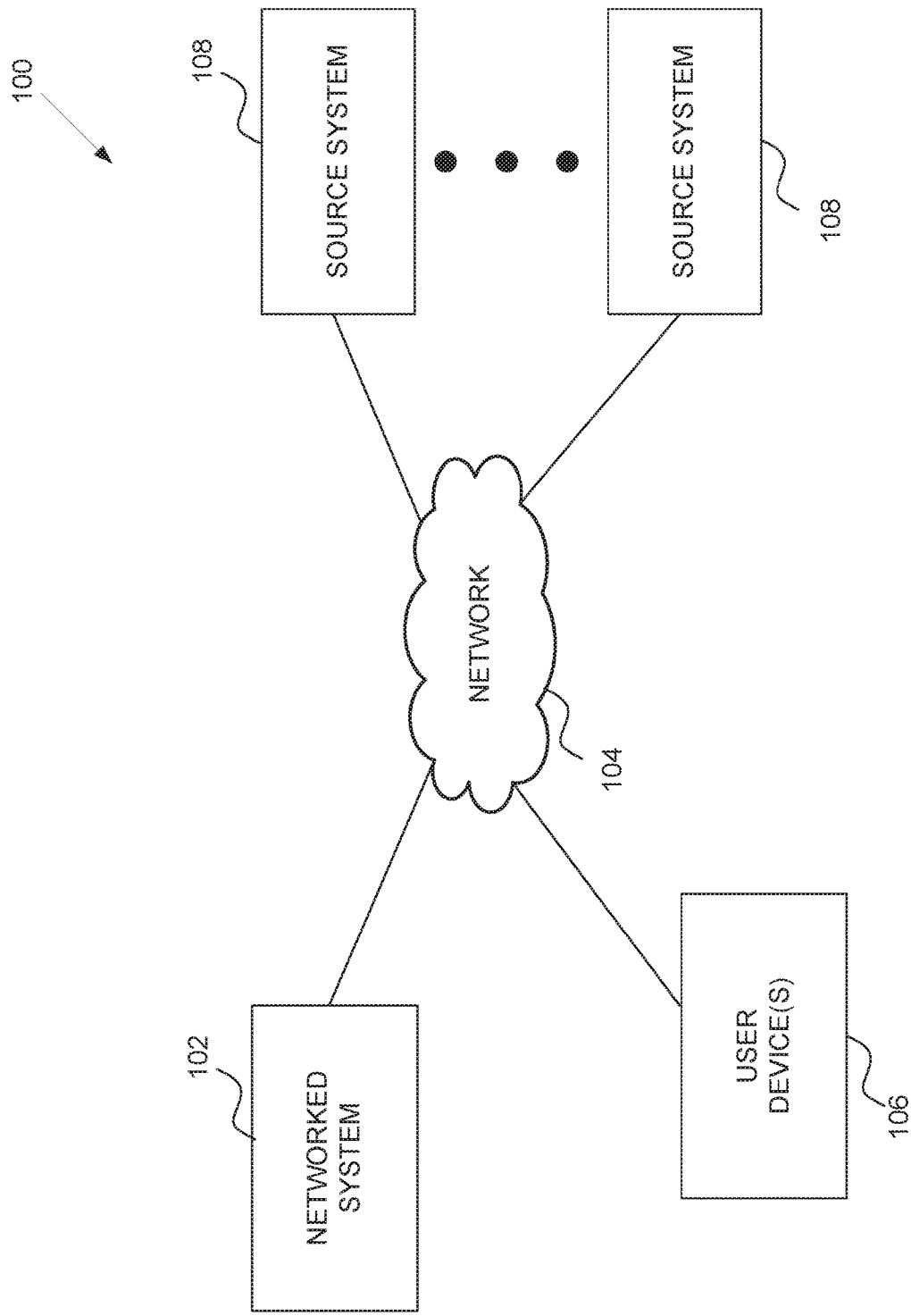
FIG. 1 is a diagram illustrating a network environment suitable for curating fashion trend information and presenting fashion trend user interfaces, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for improving a search process. In particular, example embodiments enable users to discover fashion trend information and find same or similar items without leaving a website of a networked system. The networked system curates fashion trend information from various sources (e.g., online sources). The fashion trend information is analyzed by the networked system to determine the top trends, for example, by region. An exemplar picture for each top trend is selected by the networked system. An image algorithm extracts images of fashion items (e.g., article of clothing, accessories, jewelry, shoes) from each exemplar picture. Using the extracted images, an image search is performed to identify matching or similar items from available inventory. Fashion trend user interfaces are then generated and stored (e.g., cached) by the networked system, which are immediately available, at runtime, for display when requested by a user. The networked session also stores data regarding the available inventory for each of the fashion trends. At runtime, the user initiates a search for fashion by trends. In response to receiving the indication, the networked system accesses the stored fashion trend user interfaces and causes presentation of one of the stored fashion trend user interfaces. Some selections of elements on the fashion trend user interfaces causes the networked system to perform an inventory check to verify that inventory items corresponding to a selected element are still available. A subsequent user interface with current available inventory data is caused to be displayed to the user by the networked system.

As a result, one or more of the methodologies described herein facilitate solving technical problems associated with a search process and presentation of information (e.g., fashion trend user interfaces). In particular, by presenting fashion trend information and allowing a user to visually navigate through various user interfaces to arrive at fashion items of interest all within a same website, example embodiments reduce efforts needed in order to navigate and search numerous websites or otherwise perform a number of searches in order to find fashion items of interest. As a result, resources used by one or more machines, databases, or devices (e.g., within an environment) may be reduced. Examples of such computing resources include processor cycles, network traffic, memory usage, data storage capacity, power consumption, network bandwidth, and cooling capacity.

FIG. 1 is a diagram illustrating a network environment 100 suitable for curating trend information, generating and storing fashion trend user interfaces, and presenting fashion trend user interfaces or updated versions of the fashion trend user interfaces during runtime, according to some example embodiments. The network environment 100 includes a networked system 102 communicatively coupled via a network 104 to one or more user devices 106. In example embodiments, the networked system 102 comprises components that determine top trends, generates and stores fashion trend user interfaces that include associated data (e.g., description of the fashion trend, picture, available inventory), and causes presentation of one or more of the stored fashion trend user interfaces (or an updated version of the stored fashion trend user interface) at runtime. The components of the networked system 102 are described in more detail in connection with FIG. 2 and may be implemented in a computer system, as described below with respect to FIG. 10.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 each have a browser or a similar application communicatively coupled via the network 104 to the networked system 102 in order to research fashion trends and view the fashion trend user interfaces. The user device 106 may comprise, but is not limited to, a smartphone, tablet, laptop, multi-processor system, microprocessor-based or programmable consumer electronics, game console, set-top box, or any other device that a user utilizes to communicate over the network 104. In some embodiments, the user devices 106 comprise a display module (not shown) to display information (e.g., in the form of user interfaces). In some embodiments, the user devices 106 comprise one or more of a touch screen, camera, keyboard, microphone, and Global Positioning System (GPS) device. The user devices 106 is a device of a user, which is used to display information, perform searches, or navigate to particular information, for example, by using the browser.

In example embodiments, the source systems 108 (e.g., servers) are associated with third party sources that provide fashion trend information to the networked system 102 via the network 104. Accordingly, the networked system 102 accesses fashion trend information which is used to identify top trends in various regions. Each of the source systems 108 may comprise fashion trend information for a particular region or a plurality of regions. In some embodiments, the source systems 108 comprise websites or entities that collect, store, and provide access to the fashion trend information. Thus, the source systems 108 comprise one or more of, for example, social media sites (e.g., Twitter, Instagram) providing social media information (e.g., Twitter feeds containing location-specific fashion trend information, social media posts of top bloggers), sales data systems that provide sales data for fashion items, and online fashion magazine sites/servers. In some embodiments, the networked system 102 accesses the fashion trend information on the source systems 108 using a web crawler.

In example embodiments, any of the systems, machines, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of networked systems 102, user devices 106, and source systems 108 may be embodied within the network environment 100. Furthermore, some components or functions of the network environment 100 may be combined or located elsewhere in the network environment 100.

While only a single networked system 102 is shown, alternative embodiments may contemplate having more than one networked systems 102 to perform operations discussed herein for the networked system 102. For example, one or more networked system 102 may be associated with each of a plurality of different regions in the world to analyze local regional fashion trend information. Having networked systems 102 that are focused on specific parts of the world can be useful since each area/region in the world has different fashion trend information.

Figure 2:
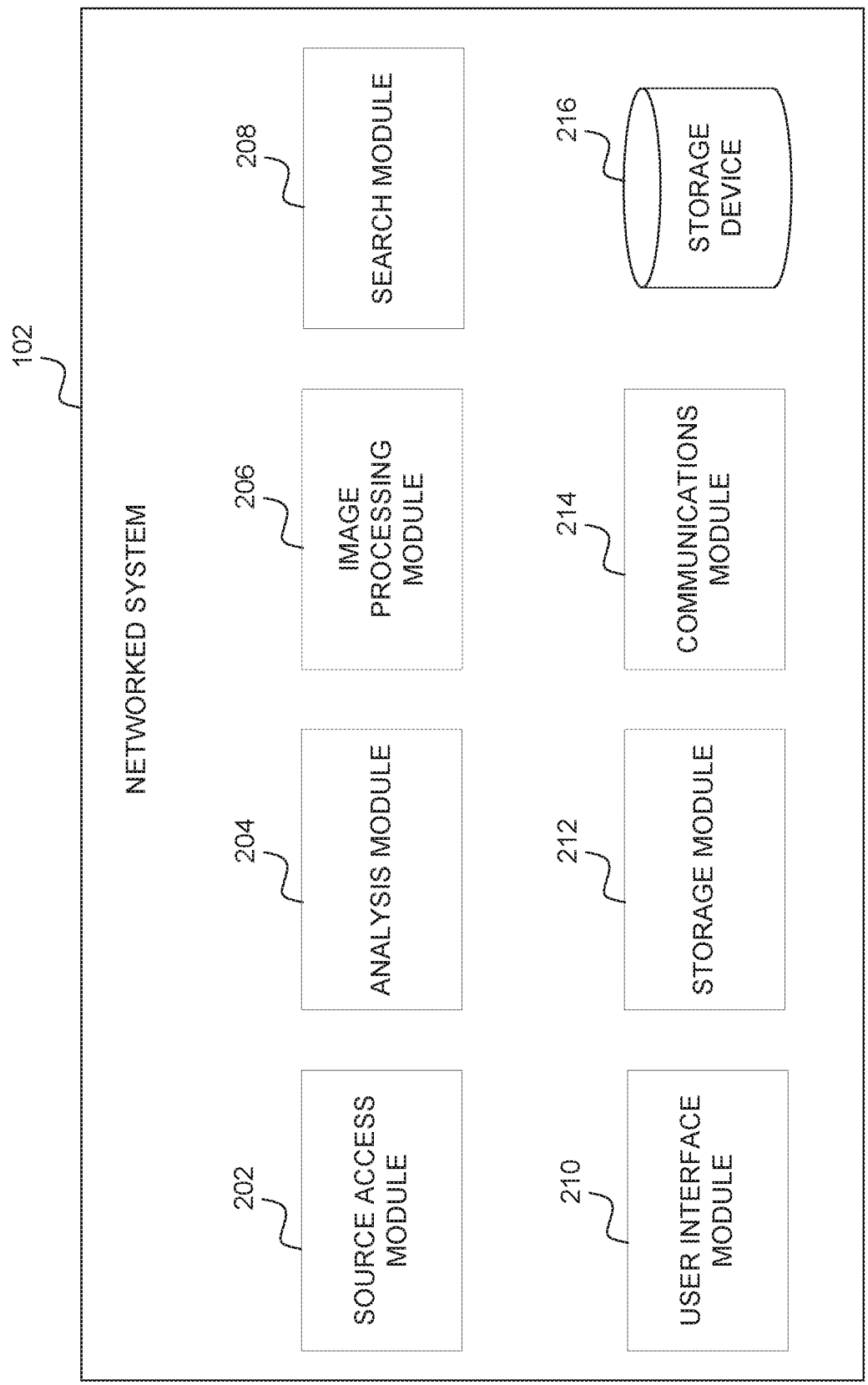
FIG. 2 is a block diagram illustrating components of a networked system, according to some example embodiments.

FIG. 2 is a block diagram illustrating components of the networked system 102, according to some example embodiments. In example embodiments, the networked system 102 comprises components that access fashion trend information from sources, analyses the fashion trend information to determine top trend, performs image searches for items (e.g., also referred to as "available inventory" or "inventory items") found in pictures corresponding to the top trends, and generates and stores fashion trend user interfaces and associated data (e.g., the available inventory). To enable these operations, the networked system 102 comprises a source access module 202, an analysis module 204, an image processing module 206, a search module 208, a user interface module 210, a storage module 212, a communications module 214, and a data storage 216 all configured to communicate with each other (e.g., via a bus, shared memory, or a switch). The networked system 102 may also comprise other components (not shown) that are not pertinent to example embodiments. Furthermore, any one or more of the components (e.g., engines, modules, storage) described herein may be implemented using hardware (e.g., a processor of a machine) or a combination of hardware and software. Moreover, any two or more of these components may be combined into a single component, and the functions described herein for a single component may be subdivided among multiple components.

The source access module 202 manages access (e.g., retrieving, receiving) to fashion trend information from the source systems 108. In example embodiments, the source access module 202 accesses fashion trend information (e.g., brands, styles, colors, designers that are popular) including articles, online magazines, sales data (e.g., for various fashion items), social media information related to fashion (e.g., Twitter feeds, blogs), pictures, and other information that indicate a current preference or trend in fashion. In example embodiments, the source access module 202 looks for keywords or phrases that indicate a fashion trend, designer, style, and so forth. The fashion trend information accessed from the source system 106 may be stored to the data storage 216 in some embodiments. In some embodiments, the source access module 202 uses a web crawler to access at least some of the fashion trend information. The source access module 202 also uses web searches to access fashion trend information.

The analysis module 204 analyses the fashion trend information accessed by the source access module 202 for each region. In one embodiment, the analysis module 204 reviews Twitter feeds and extracts words and phrases that indicate fashion trend information. The analysis module 204, in some embodiments, provides those extracted words and phrases to the source access module 202, which performs a web search for articles (e.g., from magazines) using the words and phrases to find matches. The matching articles are then provided to the analysis module 204 for further analysis. Additionally or alternatively, the analysis module 204 analyses articles from online magazines. For example, the analysis module 204 extracts key words/phrases from the articles. The analysis module 204 may, for example, implement a counter for each set of key words/phases. In some embodiments, the sets of key words/phases with the highest count are considered top trends. The key words/phrases can include, for example, names of designers, types of articles of clothing, colors, and brands.

In some embodiments, the analysis module 204 takes into consideration sales data for each region. In some cases, the sales data provides a weighting that is applied to the counts in the counter to adjust scores associated with the counts. In other cases, the sales data is a component considered by the analysis module 204 in addition to the count.

With respect to blogs, the analysis module 204 identifies bloggers in each region that are the most popular. For example, the most popular bloggers are identified based on the number of followers they have. In some embodiments, the analysis module 204 also analyses blogs of the most popular fashion bloggers for each region to identify fashion trends such as, for example, items, styles, colors, and designers they recommend.

Once the top trends and/or top bloggers are identified by the analysis module 204, the image processing module 206 takes pictures from the fashion trend information that are associated with the top trends or bloggers and extracts images of fashion items (e.g., articles of clothing, jewelry, shoes, other accessories). In example embodiments, the image processing module uses an edge detection algorithm to extract the images of the fashion items.

The search module 208 receives the extracted images from the image processing module 206 and performs image searches to identify matching items (also referred to herein as "available inventory" or "inventory items"). Data from the matching items is retrieved by the search module 208. The data includes, for example, an image of the matching item, description, price, and availability. The data may be stored to the storage device 216 with an association (e.g., link) to the corresponding fashion trend.

The user interface module 210 generates the fashion trend user interfaces. In example embodiments, the fashion trend user interfaces include one or more versions of a home fashion trend user interfaces and a plurality of top trend user interfaces. The home fashion trend user interfaces are a highest level user interface from where a user starts their navigation to arrive at items of interest. The home fashion trend user interfaces include one or more of an interactive world fashion trend user interface, a social network fashion trend user interface, and a runway fashion trend user interface. Each of these types of home fashion trend user interfaces will be discussed in more detail in connection with FIG. 5 below.

The top trend user interfaces each correspond to a particular top trend. The top trend user interfaces are presented based on a selection of an element on the home fashion trend user interface, and thus are navigated to from the home fashion trend user interface. Each top trend user interface may include one or more of a description of the trend information for the top trend, a picture corresponding to the top trend, and available inventory corresponding to the top trend. In example embodiments, the top trend user interfaces comprise one or more of a regional user interface, a blogger fashion trend user interface, and a runway designer user interface. Each of these top trend user interfaces will be discussed in more detail in connection with FIG. 6 to FIG. 9 below.

The storage module 212 manages storage of the generated fashion trend user interfaces to the storage device 216. The stored fashion trend user interfaces are later accessed, by the storage module 212, at runtime and provided to a user device of a requesting user.

The communications module 214 manages exchange of communications with the user devices 106 during runtime. Specifically, the communications module 214 receives an indication to initiate a search for fashion by trends. In response, the communication module 214 works with the storage module 212 to access and provide (e.g., cause presentation of) one or more home fashion trend user interfaces. Additionally, the communication module 214 receives selections of selectable elements on the home fashion trend user interfaces and provides, in response, top trend user interfaces (via the storage module 212 accessing the top trend user interfaces). Further still, the communication module 214 receives a selection of an item (e.g., one of the available inventory) shown on the top trend user interface. In response, the communication module 214 can provide, via the storage module 212, an item information page for the selected item, or the communication module 214 links (e.g., provides a link to, redirects) the user device to the information page for the selected item.

Figure 3:
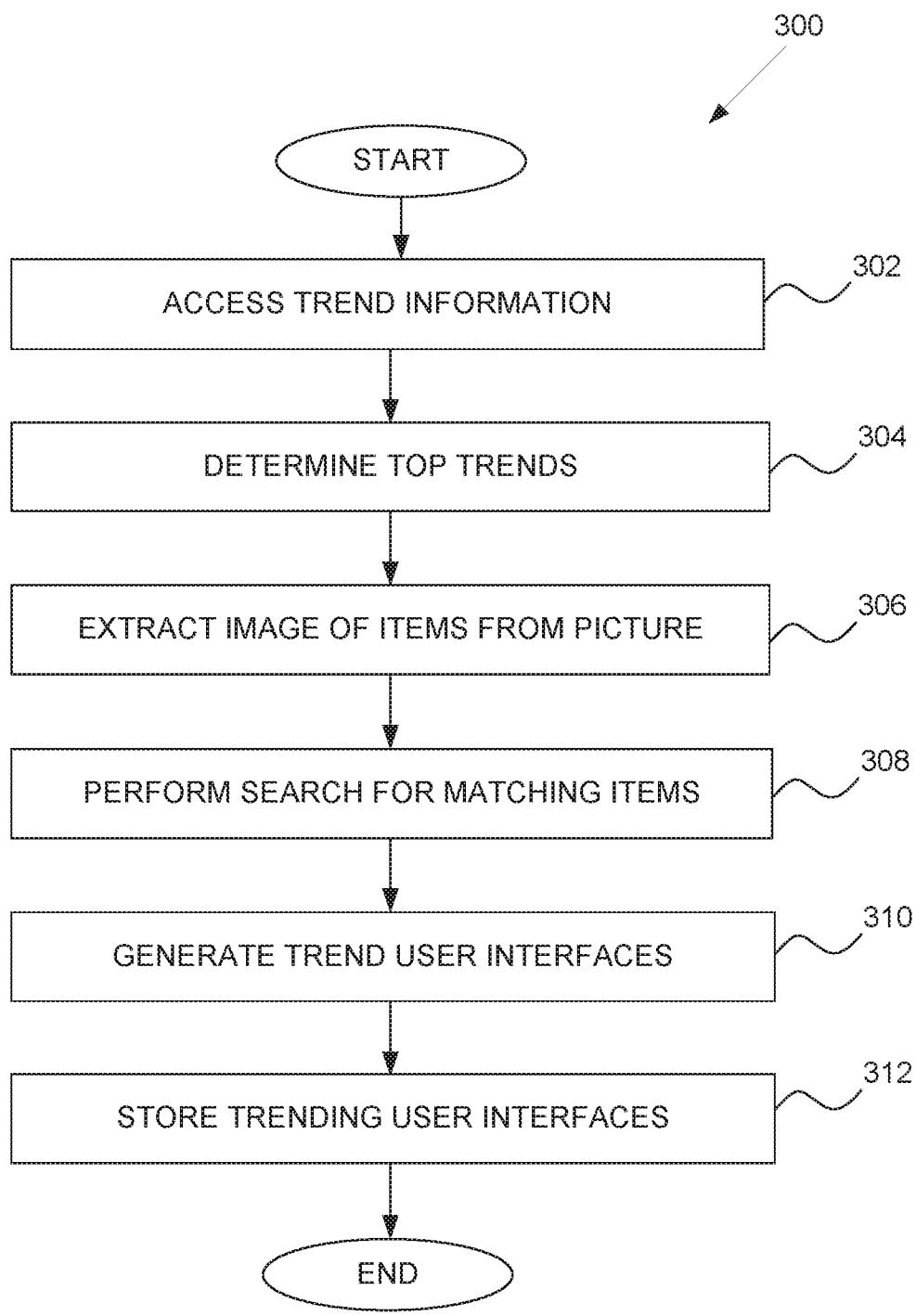
FIG. 3 is a flowchart illustrating operations of a method for generating the fashion trend user interfaces, according to some example embodiments.

FIG. 3 is a flowchart illustrating operations of a method 300 for generating the fashion trend user interfaces, according to some example embodiments. Operations in the method 300 may be performed by the networked system 102, using components described above with respect to FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, fashion trend information is accessed by the source access module 202. In example embodiments, the source access module 202 accesses various source systems 108 for news (e.g., articles on fashion), online magazines (e.g., fashion magazines, runway magazines), sales data (e.g., for various fashion items), social media information related to fashion (e.g., Twitter feeds, blogs), pictures, and other information that indicate a current preference or trend in fashion (e.g., trending brands, styles, colors, or designers). The source access module 202 uses a web crawler and web searches to access at least some of the fashion trend information.

In operation 304, top trends are determined by the analysis module 204. For example, the analysis module 204 reviews Twitter feeds and extracts words and phrases that indicate fashion trend information. The analysis module 204, in some embodiments, provides those extracted words and phrases to the source access module 202, which performs a web search for articles (e.g., from magazines) using the words and phrases to find matches. The matching articles are then provided to the analysis module 204 for further analysis. Additionally or alternatively, the analysis module 204 analyses articles and extracts key words/phrases from the articles. The analysis module 204 may, for example, implement a counter for each set of key words/phases. The key words/phrases can include, for example, names of designers, types of articles of clothing, colors, and brands. In example embodiments, the analysis module 204 also considers sales data for each region in determining top trends for each region. In some cases, the sales data provides a weighting that is applied to the counts. In other cases, the sales data is a component considered by the analysis module 204 in addition to the count.

Further still, the analysis module 204 identifies bloggers in each region that are the most popular, for example, based on the number of followers they have. In some embodiments, the analysis module 204 also analyses blogs of the most popular fashion bloggers for each region to identify fashion trends such as, for example, items, styles, colors, and designers they recommend.

In operation 306, images of items are extracted from pictures associated with the top trends. Once the top trends and/or top bloggers are identified in operation 304, the image processing module 206 takes pictures from the fashion trend information that correspond to the top trends or bloggers (e.g., pictures from the blogger's webpage, picture from runway shows) and extracts images of fashion items (e.g., articles of clothing, jewelry, shoes, other accessories) from the pictures. In example embodiments, the image processing module uses an edge detection algorithm to extract the images of the fashion items.

In operation 308, the search module 208 searches for matching items using the extracted images of fashion items from operation 306. In example embodiments, the search module 208 receives the extracted images from the image processing module 206 to perform image searches for matching items. In some embodiments, the search is conducted within a marketplace maintained by the networked system 102. In other embodiments, the search is conducted within the network environment 100 (e.g., anywhere on the Internet). Data from the matching items is retrieved by the search module 208. The data includes, for example, one or more of an image of the matching item, description, price, and availability. The data may be stored to the storage device 216 with an association (e.g., link) to the corresponding top fashion trend.

In operation 310, fashion trend user interfaces are generated by the user interface module 210. In example embodiments, the fashion trend user interfaces include one or more versions of a home fashion trend user interfaces and a plurality of top trend user interfaces. The home fashion trend user interfaces are a highest level user interface from where a user starts their navigation (through a top trend user interface) to arrive at items of interest. The home fashion trend user interfaces include one or more of an interactive world fashion trend user interface, a social network fashion trend user interface, and a runway fashion trend user interface. The top trend user interfaces each correspond to a particular top trend. Each top trend user interface may include a description of the trend information for the top trend, a picture corresponding to the top trend, and available inventory corresponding to the top trend. In example embodiments, the top trend user interfaces comprise one or more of a regional user interface, a blogger fashion trend user interface, and a runway designer user interface.

In operation 312, the generated fashion trend user interfaces are stored to the data storage 216 by the storage module 212. The stored fashion trend user interfaces accessed during runtime and provided to the user device of a requesting user.

Figure 4:
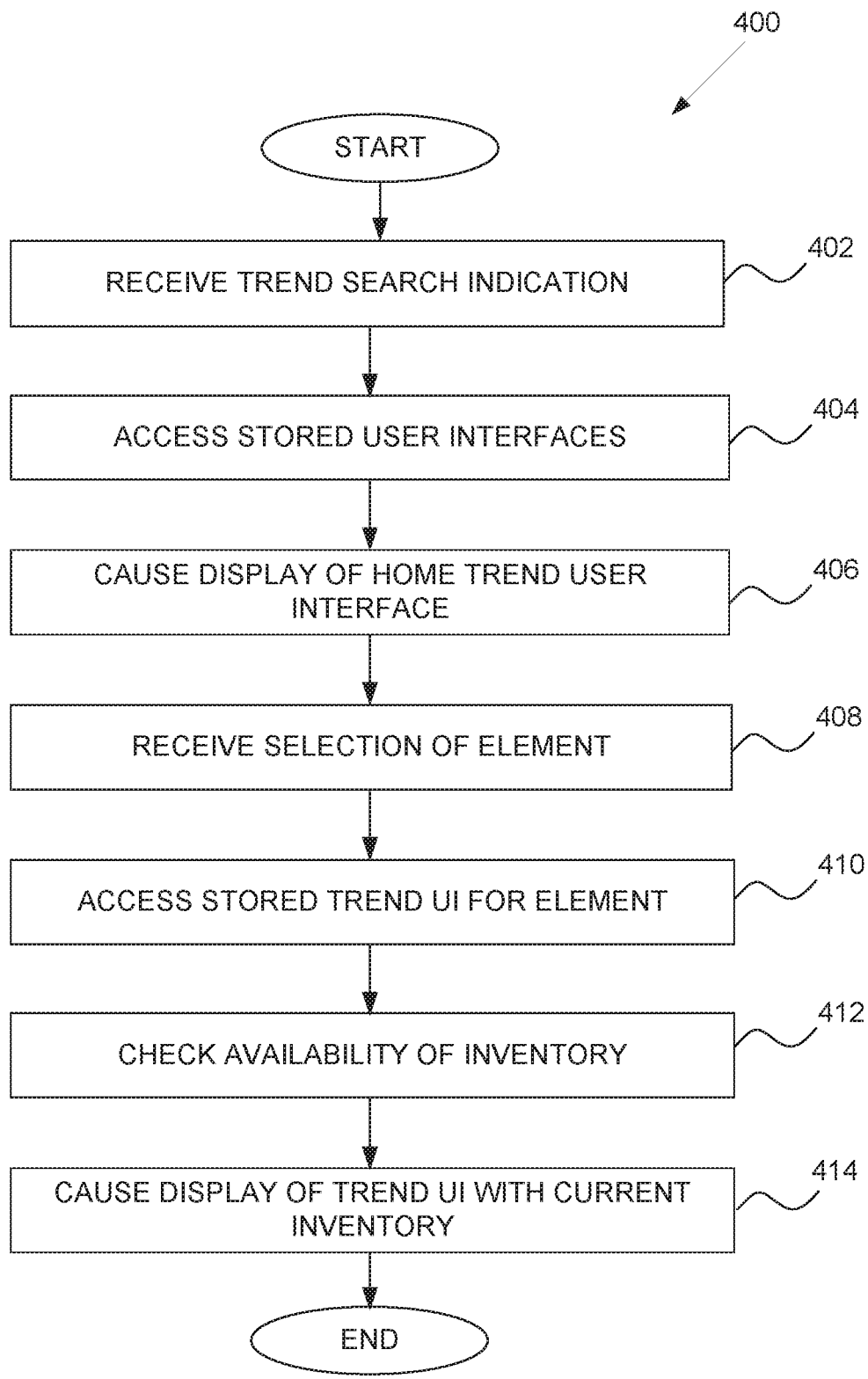
FIG. 4 is a flowchart illustrating operations of a method for presenting a version of the fashion trend user interfaces, according to some example embodiments.

FIG. 4 is a flowchart illustrating operations of a method 400 for presenting a version of the fashion trend user interfaces at runtime, according to some example embodiments. Operations in the method 400 may be performed by the networked system 102, using components described above with respect to FIG. 2. Accordingly, the method 400 is described by way of example with reference to the networked system 102. However, it shall be appreciated that at least some of the operations of the method 400 may be deployed on various other hardware configurations or be performed by similar components residing elsewhere in the network environment 100. Therefore, the method 400 is not intended to be limited to the networked system 102.

In operation 402, the networked system 102 receives an indication of a fashion trend search. In example embodiments, the communications module 214 receives the indication to initiate a search for fashion by trends from the user device 106 of a requesting user. For example, the user may attempt to access or navigate to a webpage that provides functionalities to perform fashion trend searches.

In operation 404, the stored user interfaces are accessed. In particular, the communication module 214 works with the storage module 212 to access one or more home fashion trend user interfaces.

In operation 406, one or more of the home trend user interfaces are caused to be displayed on the user device 106 of the requesting user. In some cases, the user interfaces are transmitted to the user device 106 for display. In other cases, instructions for rendering the user interface on the user device 106 are transmitted.

In operation 408, a selection of a selectable element on the home trend user interface is received. In example embodiments, the communication module 214 receives the selection of the selectable element on the home fashion trend user interfaces. In response, the communication module 214 instructs the storage module 212 to access a stored top trend user interface corresponding to the selected element in operation 410.

In operation 412, inventory items shown on the top trend user interface that is accessed in operation 410 are checked, by the search module 208, to ensure that each item is currently still available. Operation 412 may be optional in some embodiments.

In operation 414, the top trend user interface with current inventory items is caused to be presented on the user device 106 of the requesting user by the communications module 214. In embodiments where operation 412 is performed, a revised version of the top trend user interface may be updated by the user interface module 210, if necessary, to remove inventory items that are no longer available, or in some cases, to add a new inventory item. The version of the top trend user interface is then displayed on the user device 106.

Figure 5:
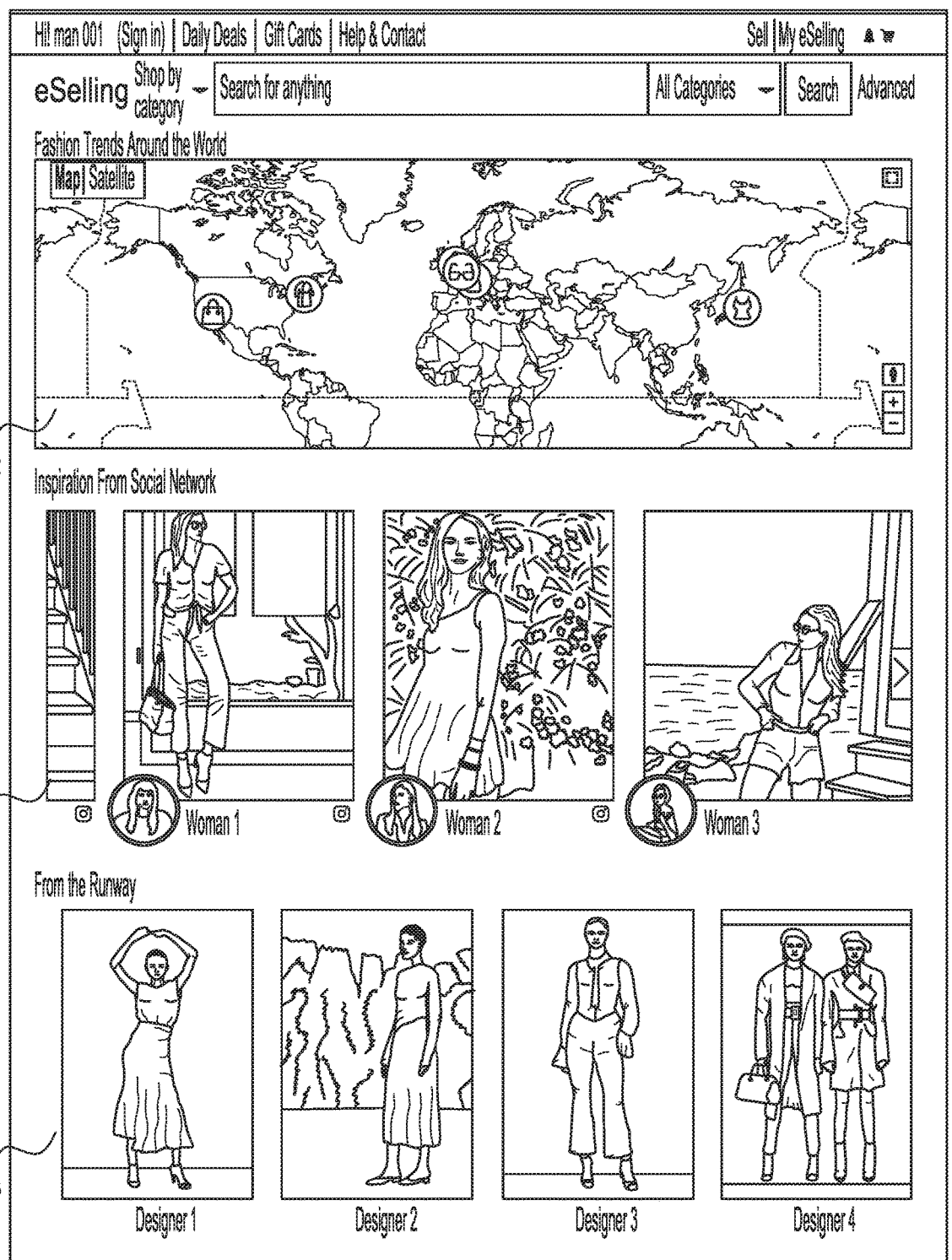
FIG. 5 is an example home fashion trend user interface, according to some example embodiments.

FIG. 5 is an example screenshot illustrating a home trend user interface 500 accessed from the storage device 216, according to some example embodiments. In the example of FIG. 5, the home fashion trend user interface 500 includes three user interface modules 502, 504, and 506. In some embodiments, the user interface modules 502, 504, and 506 can each be a home trend user interface (e.g., each displayed on a different screenshot). As such, the user interface modules 502, 504, and 506 are also referred to herein as a "home trend user interface" or "fashion trend user interface." In various embodiments, the home trend user interface 500 may comprise any number of user interface modules.

The home trend user interface 502 comprises a world fashion trend user interface. In example embodiments, the world fashion trend user interface allows a user to search for fashion trends throughout the world and to navigate, through successive user interfaces, to an inventory item the user is interested in obtaining or viewing more information about. The world fashion trend user interface will be discussed in more detail in connection with FIG. 6 below.

The home trend user interface 504 comprises a social network fashion trend user interface. In example embodiments, the social network fashion trend user interface allows the user to search for fashion trends based on top bloggers (e.g., Woman1, Woman2, Woman3) on one or more social networks. For example, the social network fashion trend user interface can be associated with Instagram, and the top bloggers comprise the top bloggers on Instagram. Bloggers from other social networks or combinations of social networks may be used as well.

The home trend user interface 506 comprises a runway fashion trend user interface. In example embodiments, the runway fashion trend user interface allows the user to search for fashion trends based on a runway show, runway look, or designer (e.g., Designer1, Designer2, Designer3, Designer4).

Figure 6:
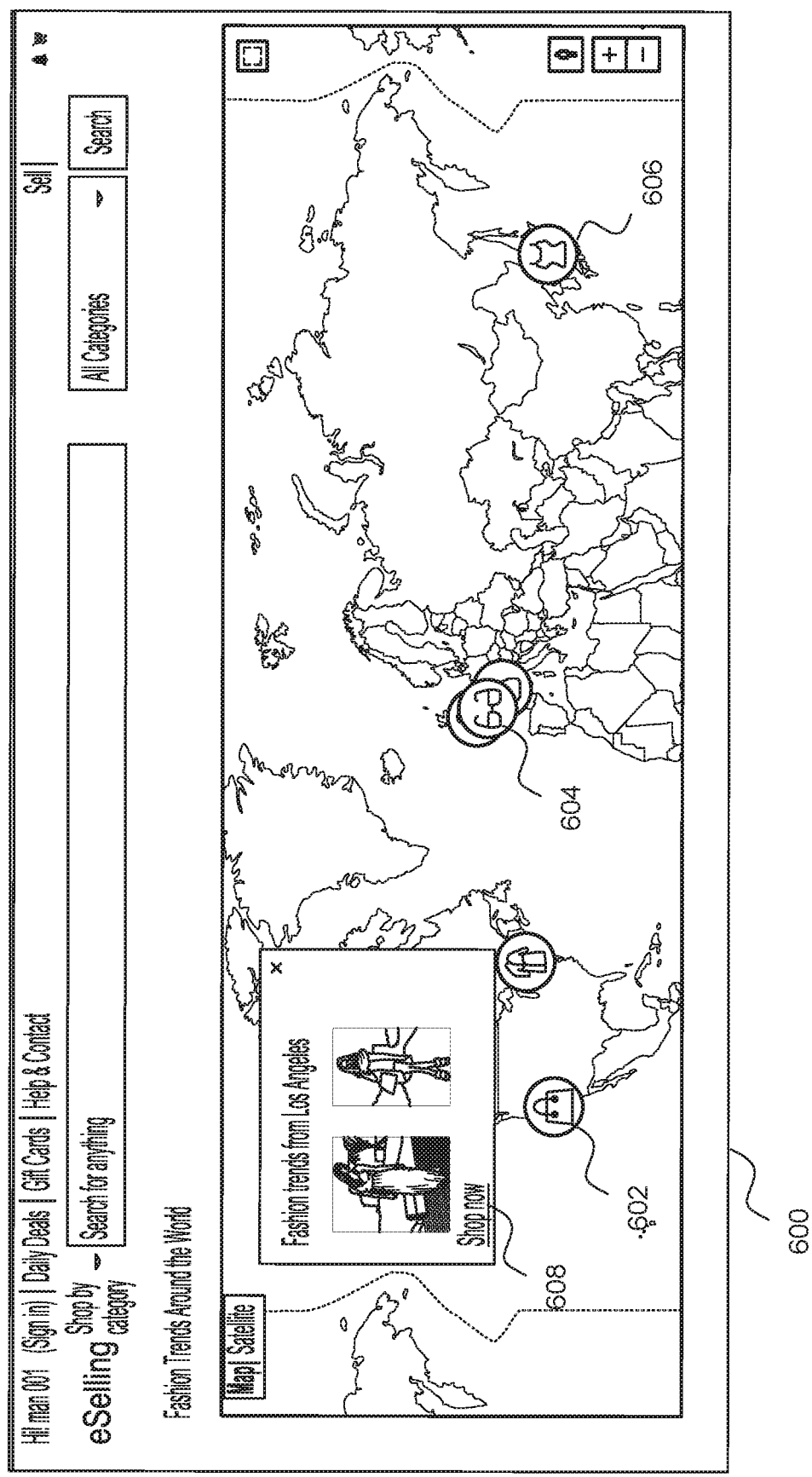
FIG. 6 is an example interactive world fashion trend user interface, according to some example embodiments.

FIG. 6 is an example interactive world fashion trend user interface 600 (world fashion trend user interface 502), according to some example embodiments. In example embodiments, the world fashion trend user interface 600 is accessed from the storage device 216 at runtime. The world fashion trend user interface 600 is based on the location specific data accessed and/or maintained by the networked system 102. Using the location specific data, the networked system 102 determines different shopping behaviours from around the world. The different fashion behaviours, in some embodiments, are combined with trending location data from one or more social networks, such as Twitter feeds from Twitter.

In example embodiments, each location (e.g., city, country, region) having trending fashion is represented with a fashion icon (e.g., icons 602, 604, and 606). When a user hovers over one of the fashion icons (e.g., icon 602) representing a location, a popup interface 608 is presented that shows fashion trends for the corresponding location. The user can elect to shop (or obtain more information about) the fashion trend corresponding to the popup interface 608 by selecting the icon 602 or an element within the popup interface 608. In the present example, the user elects to shop fashion trends from Los Angeles. The selection to shop fashion trends from Los Angeles cause the regional user interface of FIG. 7 to be presented.

Figure 7:
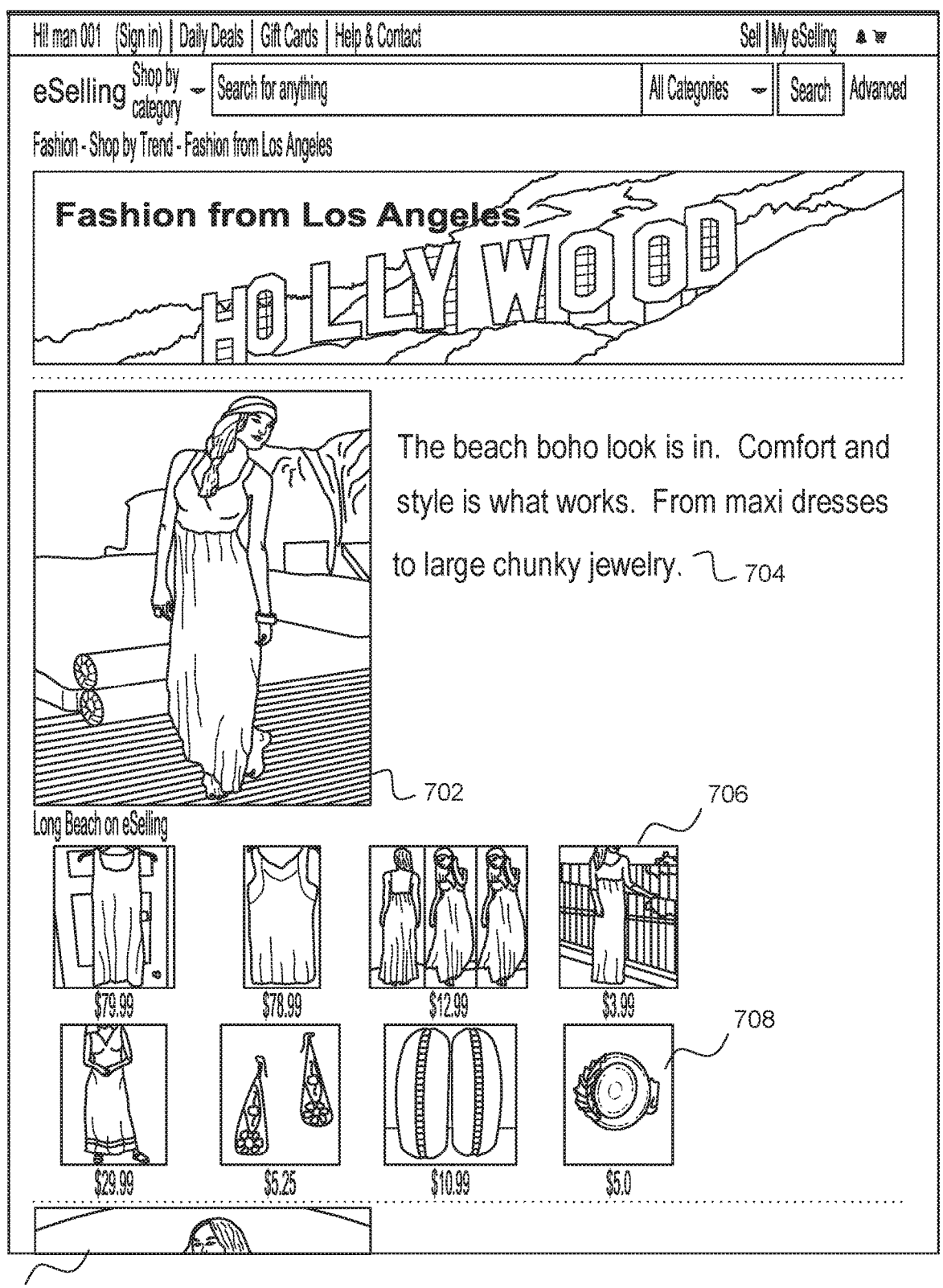
FIG. 7 is an example regional user interface, according to some example embodiments.

FIG. 7 is an example regional user interface 700 accessed from the storage device 216 at runtime, according to some example embodiments. In the present example, the regional user interface 700 is for Los Angeles. The regional user interface 700 includes a exemplar picture 702 representing the fashion trend and can include a description 704 of the fashion trend at the location. The picture 702 was used by the image processing module 206 to search for matching inventory items prior to runtime. For example, the image processing module 206 extracts images of a dress and jewelry worn by the individual shown in the picture 702. Using the extracted images, the search module 208 finds a plurality of matching inventory items and provides an image of some of the inventory items (e.g., 706, 708) on the regional user interface 700. In some cases, the search module 208 may also search for available inventory items base on the description 704 or other fashion trend information associated with the selected location.

In some embodiments, the search module 208 checks the availability of the matching inventory items in real-time to ensure that the inventory items is still available before the regional user interface 700 is shown. An inventory item that is no longer available is removed from the stored regional user interface 700 and a revised version of the stored regional user interface 700 (without the unavailable inventory item) is presented. In some embodiments, the search module 208 may find alternative inventory items to replace inventory items that are no longer available. In these embodiments, the user interface module 210 revises the regional user interface 700 for display on the user device 106.

In example embodiments, the user can select one of the images of the inventory items (e.g., 706, 708) to view more information for the selected inventory item. The selection causes an item page for the inventory item to be shown. In some embodiments, the item page is accessed from the storage device 216. In other embodiments, the user device 106 of the user is redirected, via the network 104, to the item page located outside of the networked system 102.

Figure 8:
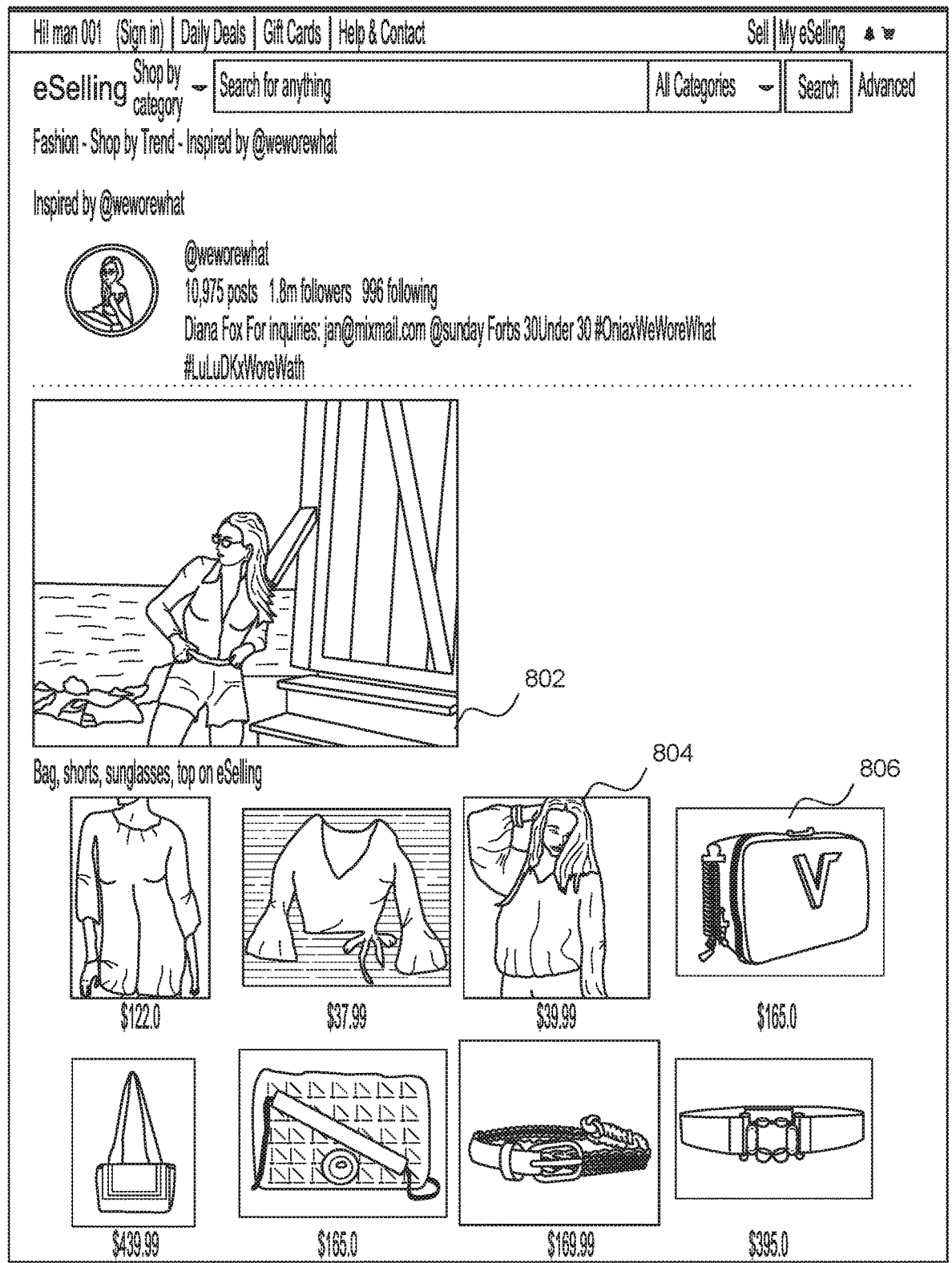
FIG. 8 is an example blogger fashion trend user interface, according to some example embodiments.

FIG. 8 is an example blogger fashion trend user interface 800, according to some example embodiments. In example embodiments, the user selects an element, on the social network fashion trend user interface (e.g., home trend user interface 504) that represents the blogger that the user is interested in. For example, the user has selected Woman3 from the social network fashion trend user interface of FIG. 5 (as illustrated by the picture 802 on the blogger fashion trend user interface 800 matching a picture corresponding to Woman3 on the home trend user interface 504).

The blogger fashion trend user interface 800 includes the picture 802, and in some embodiments, a description (not shown) of the fashion trend associated with the selected blogger. The picture 802 was used by the image processing module 206 to search for matching inventory items. For example, the image processing module 206 extracts images of a shirt and belt worn by the individual shown in the picture 802. Using the extracted images, the search module 208 finds a plurality of matching inventory items (e.g., 804, 806) on the blogger fashion trend user interface 800. In some cases, the search module 208 may also search for available inventory items base on the description, posts from the blogger, or other fashion trend information.

In some embodiments, the search module 208 checks the availability of the matching inventory items in real-time to ensure that the inventory items are still available before the blogger fashion trend user interface 800 is shown. An inventory item that is no longer available is removed from the stored blogger fashion trend user interface 800 and a revised version of the stored blogger fashion trend user interface 800 (without the unavailable inventory item) is presented, which provides an image of some of the inventory items (e.g., 804, 806) on the blogger fashion trend user interface 800. In some embodiments, the search module 208 may find alternative inventory items to replace inventory items that are no longer available.

In example embodiments, the user can select one of the images of the inventory items (e.g., 804, 806) to view more information for the selected inventory item. The selection causes an item page for the inventory item to be shown. In some embodiments, the item page is accessed from the storage device 216. In other embodiments, the user device 106 of the user is redirected, via the network 104, to the item page located outside of the networked system 102.

Figure 9:
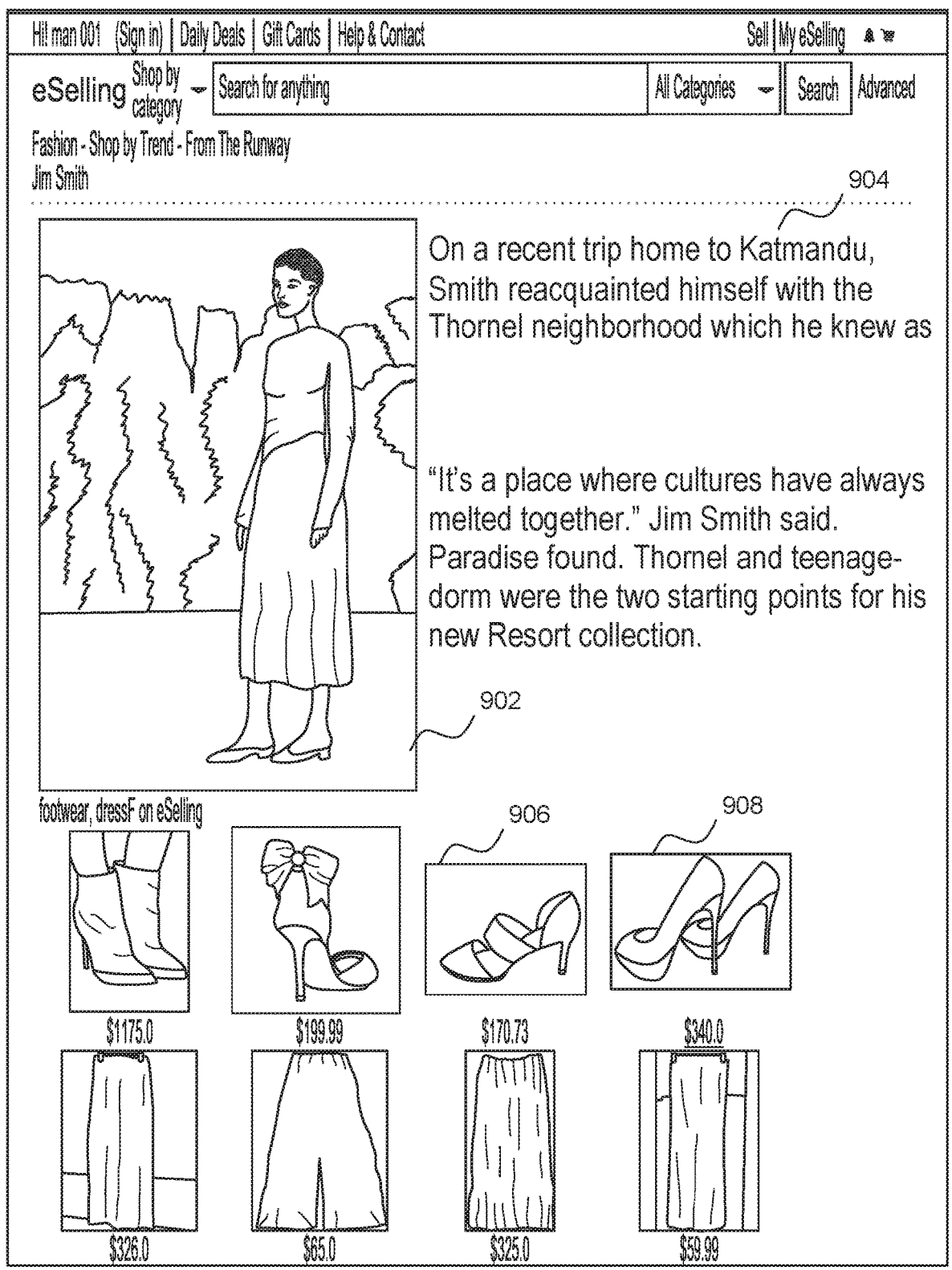
FIG. 9 is an example runway designer user interface, according to some example embodiments.

FIG. 9 is an example runway designer user interface 900, according to some example embodiments. In example embodiments, the user selects an element, on the runway fashion trend user interface (e.g., home trend user interface 506) that represents a runway trend that the user is interested in. In the embodiment of FIG. 5, the runway trend is based on designers. In the present example, the user has selected Designer2 from the runway fashion trend user interface of FIG. 5 (as illustrated by the picture 902 on the runway designer user interface 900 matching a picture corresponding to Designer2 on the home trend user interface 506).

The runway designer user interface 900 includes the picture 902 and a description 904 of the fashion trend associated with the selected designer. The picture 902 was used by the image processing module 206 to search for matching inventory items. For example, the image processing module 206 extracts images of a skirt and shoes worn by the individual shown in the picture 902. Using the extracted images, the search module 208 finds a plurality of matching inventory items (e.g., 906, 908) on the runway designer user interface 900. In some cases, the search module 208 may also search for available inventory items base on other fashion trend information such as the description or articles about the designer.

In some embodiments, the search module 208 checks the availability of the matching inventory items in real-time to ensure that the inventory items are still available before the runway designer user interface 900 is shown. An inventory item that is no longer available is removed from the stored runway designer user interface 900 and a revised version of the stored runway designer user interface 900 (without the unavailable inventory item) is presented and provides an image of some of the inventory items (e.g., 906, 908) on the runway designer user interface 900. In some embodiments, the search module 208 may find alternative inventory items to replace inventory items that are no longer available. In these embodiments, the user interface module 210 revises the runway designer user interface 900 for display on the user device 106.

In example embodiments, the user can select one of the images of the inventory items (e.g., 906, 908) to view more information for the selected inventory item. The selection causes an item page for the inventory item to be shown. In some embodiments, the item page is accessed from the storage device 216. In other embodiments, the user device 106 of the user is redirected, via the network 104, to the item page located outside of the networked system 102.

Figure 10:
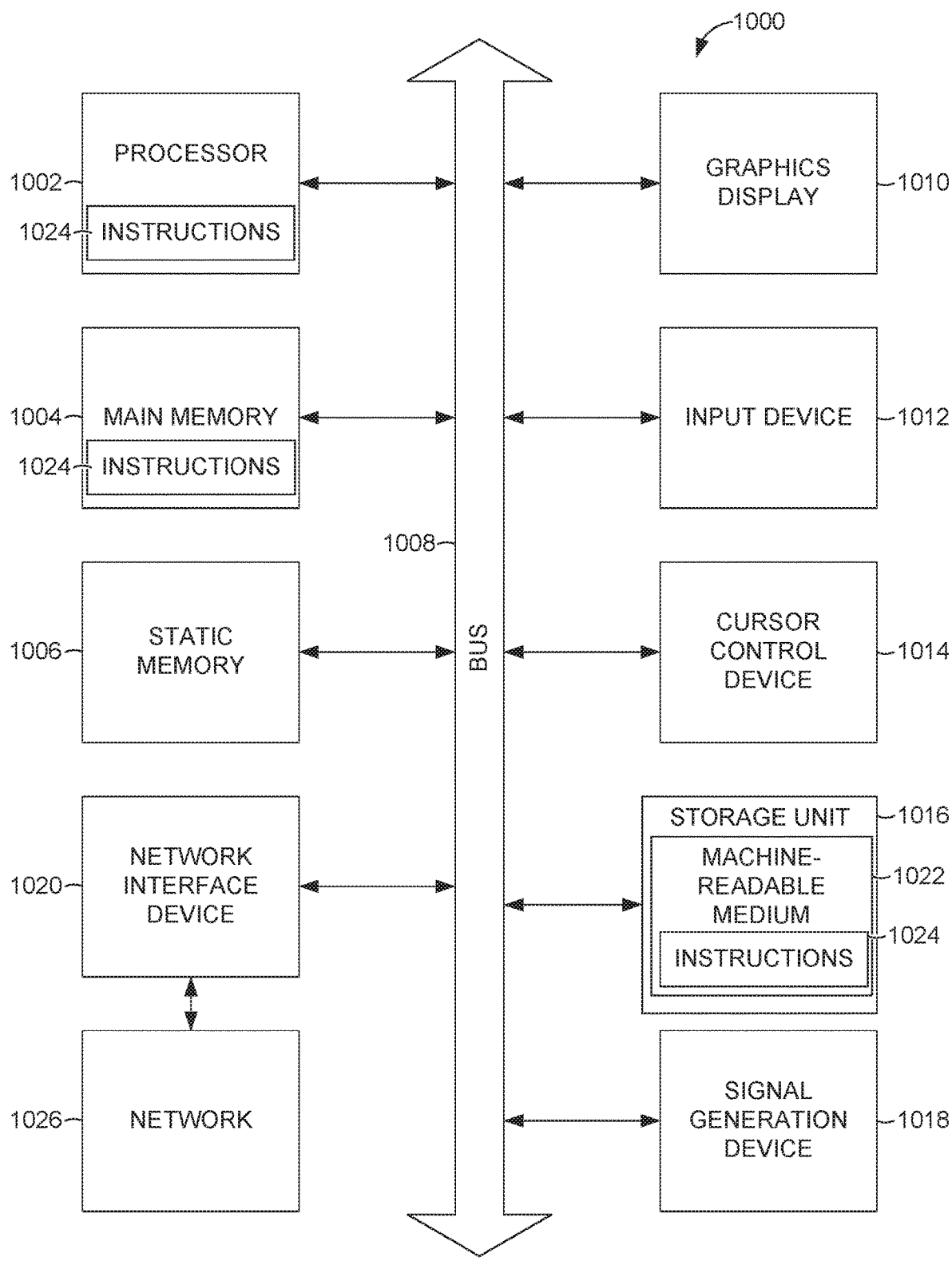
FIG. 10 is a block diagram illustrating components of a machine, according to some example embodiments, able to read instructions from a machine-readable medium and perform any one or more of the methodologies discussed herein.

FIG. 10 illustrates components of a machine 1000, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 10 shows a diagrammatic representation of the machine 1000 in the example form of a computer device (e.g., a computer) and within which instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute the flow diagrams of FIG. 3 and FIG. 4. In one embodiment, the instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, or a cathode ray tube (CRT), or any other display capable of displaying graphics or video). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes a machine-readable medium 1022 (e.g., a tangible machine-readable storage medium) on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered as machine-readable media (e.g., tangible and non-transitory machine-readable media). The instructions 1024 may be transmitted or received over a network 1026 via the network interface device 1020.

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1022 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for improving a search process. The method comprises accessing, from online sources by a networked system, fashion trend information, the fashion trend information including pictures illustrating fashion trends; determining, by the networked system, a plurality of top fashion trends; extracting, using an image detection algorithm of the networked system, images of fashion items from at least one picture associated with each of the top fashion trends; using the extracted images of the fashion items, performing an image search for matching available inventory items; generating, by the networked system, a plurality of fashion trend user interfaces, the plurality of fashion trend user interfaces each comprising selectable elements that represent the plurality of top fashion trends; storing, by the networked system in a storage device, the plurality of fashion trend user interfaces, each of the plurality of fashion trend user interfaces including at least one picture associated with one or more of the plurality of top fashion trends, at least some of the plurality of fashion trend user interfaces including data corresponding to the matching available inventory items; receiving, at runtime, an indication to initiate a search for fashion by trends; in response to receiving the indication, accessing the plurality of stored fashion trend user interfaces; and causing presentation, on a device of a user, one of the plurality of stored fashion trend user interfaces.

In example 2, the subject matter of example 1 can optionally include receiving, from the device of the user, a selection of one of the selectable elements representing a fashion trend; and in response to receiving the selection, causing presentation of a second user interface presenting the selected fashion trend, the second user interface comprising a picture corresponding to the selected fashion trend and images of the matching available inventory items that match the fashion items in the picture corresponding to the selected fashion trend.

In example 3, the subject matter of examples 1-2 can optionally include wherein the fashion trend user interface comprises an interactive map of the world, and the selectable elements represent regions in the world; the receiving the selection of one of the selectable elements comprises receiving a selection of a region on the interactive map; and the causing presentation of the second user interface comprises causing presentation of a picture corresponding to the fashion trend for the selected region and the images of the matching available inventory items for the selected region.

In example 4, the subject matter of examples 1-3 can optionally include wherein the online sources providing the fashion trend information comprises Twitter feeds containing trending location data.

In example 5, the subject matter of examples 1-4 can optionally include accessing sales data for each of the regions, wherein the determining the one or more top fashion trends for each of the regions includes using the sales data in performing the determining.

In example 6, the subject matter of examples 1-5 can optionally include wherein the selectable elements represent top bloggers in the one or more regions, the top bloggers each providing the plurality of top fashion trends; the receiving the selection of one of the selectable elements comprises receiving a selection of one of the top bloggers; and the causing presentation of the second user interface comprises causing presentation of a picture associated with the selected top blogger and the images of the matching available inventory items associated with the top blogger.

In example 7, the subject matter of examples 1-6 can optionally include wherein the online sources providing the fashion trend information comprises social media posts posted by the top bloggers.

In example 8, the subject matter of examples 1-7 can optionally include wherein the selectable elements represent runway shows; the receiving the selection of one of the selectable elements comprises receiving a selection of one of the runway shows; and the causing presentation of the second user interface comprises causing presentation of a picture associated with the selected runway show and the images of the matching available inventory associated with the selected runway show.

In example 9, the subject matter of examples 1-8 can optionally include wherein the online sources providing the fashion trend information comprises online fashion magazines.

In example 10, the subject matter of examples 1-9 can optionally include wherein the causing the presentation of the second user interface comprises checking that each of the matching available inventory items previously stored in the storage device is still available at a time of the presentation of the second user interface; and updating a stored version of the second user interface with current available inventory items to derive the second user interface.

Example 11 is a system for improving a search process. The system includes one or more processors and a storage device storing instructions that, when executed by the one or more hardware processors, causes the one or more hardware processors to perform operations comprising accessing, from online sources, fashion trend information, the fashion trend information including pictures illustrating fashion trends; determining a plurality of top fashion trends; extracting, using an image detection algorithm, images of fashion items from at least one picture associated with each of the top fashion trends, using the extracted images of the fashion items, performing an image search for matching available inventory items; generating a plurality of fashion trend user interfaces, the plurality of fashion trend user interfaces each comprising selectable elements that represent the plurality of top fashion trends; storing, in a storage device, the plurality of fashion trend user interfaces, each of the plurality of fashion trend user interfaces including at least one picture associated with one or more of the plurality of top fashion trends, at least some of the plurality of fashion trend user interfaces including data corresponding to the matching available inventory items; receiving, at runtime, an indication to initiate a search for fashion by trends; in response to receiving the indication, accessing the plurality of stored fashion trend user interfaces; and causing presentation, on a device of a user, one of the plurality of stored fashion trend user interfaces.

In example 12, the subject matter of example 11 can optionally include receiving, from the device of the user, a selection of one of the selectable elements representing a fashion trend; and in response to receiving the selection, causing presentation of a second user interface presenting the selected fashion trend, the second user interface comprising a picture corresponding to the selected fashion trend and images of the matching available inventory items that match the fashion items in the picture corresponding to the selected fashion trend.

In example 13, the subject matter of examples 11-12 can optionally include wherein the fashion trend user interface comprises an interactive map of the world, and the selectable elements represent regions in the world; the receiving the selection of one of the selectable elements comprises receiving a selection of a region on the interactive map; and the causing presentation of the second user interface comprises causing presentation of a picture corresponding to the fashion trend for the selected region and the images of the matching available inventory items for the selected region.

In example 14, the subject matter of examples 11-13 can optionally include wherein the online sources providing the fashion trend information comprises Twitter feeds containing trending location data.

In example 15, the subject matter of examples 11-14 can optionally include accessing sales data for each of the regions, wherein the determining the one or more top fashion trends for each of the regions includes using the sales data in performing the determining.

In example 16, the subject matter of examples 11-15 can optionally include wherein the selectable elements represent top bloggers in the one or more regions, the top bloggers each providing the plurality of top fashion trends; the receiving the selection of one of the selectable elements comprises receiving a selection of one of the top bloggers; and the causing presentation of the second user interface comprises causing presentation of a picture associated with the selected top blogger and the images of the matching available inventory items associated with the top blogger.

In example 17, the subject matter of examples 11-16 can optionally include wherein the online sources providing the fashion trend information comprises social media posts posted by the top bloggers.

In example 18, the subject matter of examples 11-17 can optionally include wherein the selectable elements represent runway shows; the receiving the selection of one of the selectable elements comprises receiving a selection of one of the runway shows; and the causing presentation of the second user interface comprises causing presentation of a picture associated with the selected runway show and the images of the matching available inventory associated with the selected runway show.

In example 19, the subject matter of examples 11-18 can optionally include wherein the causing the presentation of the second user interface comprises checking that each of the matching available inventory items previously stored in the storage device is still available at a time of the presentation of the second user interface; and updating a stored version of the second user interface with current available inventory items to derive the second user interface.

Example 20 is a machine-storage medium for improving a search process. The machine-storage medium configures one or more processors to perform operations comprising accessing, from online sources, fashion trend information, the fashion trend information including pictures illustrating fashion trends; determining a plurality of top fashion trends; extracting, using an image detection algorithm, images of fashion items from at least one picture associated with each of the top fashion trends; using the extracted images of the fashion items, performing an image search for matching available inventory items; generating a plurality of fashion trend user interfaces, the plurality of fashion trend user interfaces each comprising selectable elements that represent the plurality of top fashion trends; storing, in a storage device, the plurality of fashion trend user interfaces, each of the plurality of fashion trend user interfaces including at least one picture associated with one or more of the plurality of top fashion trends, at least some of the plurality of fashion trend user interfaces including data corresponding to the matching available inventory items; receiving, at runtime, an indication to initiate a search for fashion by trends; in response to receiving the indication, accessing the plurality of stored fashion trend user interfaces; and causing presentation, on a device of a user, one of the plurality of stored fashion trend user interfaces.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers." "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
accessing, from external sources by a networked system, fashion trend information, the fashion trend information including pictures illustrating fashion trends;
determining, by the networked system, a plurality of top fashion trends from the fashion trend information;
based on the determining, extracting, using an edge detection algorithm of the networked system, images of fashion items from at least one of the pictures from the fashion trend information for each of the top fashion trends;
using the extracted images of the fashion items extracted from at least one of the pictures from the fashion trend information using the edge detection algorithm, performing, by the network system, an image search for matching available inventory items;
generating, by the networked system, a plurality of fashion trend user interfaces, the plurality of fashion trend user interfaces each comprising selectable image elements that represent the plurality of top fashion trends, the plurality of fashion tread user interfaces being a plurality of pre-generated fashion trend user interfaces for use during runtime;
storing, by the networked system in a storage device, the plurality of pre-generated fashion trend user interfaces for immediate availability during runtime, each of the plurality of pre-generated fashion trend user interfaces including at least one picture associated with one or more of the plurality of top fashion trends, at least some of the plurality of pre-generated fashion trend user interfaces including data corresponding to the matching available inventory items;
receiving, from a user at runtime, an indication to initiate a search for fashion by trends;
in response to receiving the indication, accessing the plurality of pre-generated fashion trend user interfaces and retrieving one of the plurality of pre-generated fashion trend user interfaces for presentation; and causing presentation, on a device of the user, of the retrieved one of the plurality of pre-generated fashion trend user interfaces.

2. The method of claim 1, further comprising:
receiving, from the device of the user, a selection of one of the selectable image elements representing a fashion trend; and
in response to receiving the selection, causing presentation of a second user interface of the plurality of pre-generated fashion trend user interfaces that presents the selected fashion trend, the second user interface comprising a picture corresponding to the selected fashion trend and images of the matching available inventory items that match the fashion items in the picture corresponding to the selected fashion trend.

3. The method of claim 2, wherein:
the fashion trend user interface comprises an interactive map of the world, and the selectable image elements represent regions in the world;
the receiving the selection of one of the selectable image elements comprises receiving a selection of a region on the interactive map; and
the causing presentation of the second user interface comprises causing presentation of a picture corresponding to the fashion trend for the selected region and the images of the matching available inventory items for the selected region.

4. The method of claim 1, wherein the external sources providing the fashion trend information comprises Twitter feeds containing trending location data.

5. The method of claim 3, further comprises accessing sales data for each of the regions, wherein the determining the one or more top fashion trends for each of the regions includes using the sales data in performing the determining.

6. The method of claim 2, wherein:
the selectable image elements represent top bloggers in the one or more regions, the top bloggers each providing the plurality of top fashion trends;
the receiving the selection of one of the selectable image elements comprises receiving a selection of one of the top bloggers; and
the causing presentation of the second user interface comprises causing presentation of a picture associated with the selected top blogger and the images of the matching available inventory items associated with the top blogger.

7. The method of claim 1, wherein the external sources providing the fashion trend information comprises social media posts posted by top bloggers.

8. The method of claim 2, wherein:
the selectable image elements represent runway shows;
the receiving the selection of one of the selectable image elements comprises receiving a selection of one of the runway shows; and
the causing presentation of the second user interface comprises causing presentation of a picture associated with the selected runway show and the images of the matching available inventory associated with the selected runway show.

9. The method of claim 1, wherein the external sources providing the fashion trend information comprises online fashion magazines.

10. The method of claim 2, wherein the causing presentation of the second user interface comprises:
determining whether to update the second user interface by checking whether each of the matching available inventory items on the second user interface of the plurality of pre-generated fashion trend user interfaces previously stored in the storage device is still available at a time of the presentation of the second user interface; and
based on a determination to update, updating a stored version of the second user interface with current available inventory items to derive the second user interface.

11. A system comprising:
one or more hardware processors; and
a storage device storing instructions that, when executed by the one or more hardware processors, causes the one or more hardware processors to perform operations comprising:
accessing, from external sources, fashion trend information, the fashion trend information including pictures illustrating fashion trends;
determining a plurality of top fashion trends from the fashion trend information;
based on the determining, extracting, using an edge detection algorithm, images of fashion items from at least one of the pictures from the fashion trend information for each of the top fashion trends;
using the extracted images of the fashion items extracted from at least one of the pictures from the fashion trend information using the edge detection algorithm, performing, by the system, an image search for matching available inventory items;
generating a plurality of fashion trend user interfaces, the plurality of fashion trend user interfaces each comprising selectable image elements that represent the plurality of top fashion trends, the plurality of fashion trend user interfaces being a plurality of pre-generated fashion trend user interfaces for use during runtime;
storing, in a storage device, the plurality of pre-generated fashion trend user interfaces for immediate availability during runtime, each of the plurality of pre-generated fashion trend user interfaces including at least one picture associated with one or more of the plurality of top fashion trends, at least some of the plurality of pre-generated fashion trend user interfaces including data corresponding to the matching available inventory items;
receiving, from a user at runtime, an indication to initiate a search for fashion by trends;
in response to receiving the indication, accessing the plurality of pre-generated fashion trend user interfaces and retrieving one of the plurality of pre-generated fashion trend user interfaces for presentation; and
causing presentation, on a device of the user, of the retrieved one of the plurality of pre-generated fashion trend user interfaces.

12. The system of claim 11, wherein the operations further comprise:
receiving, from the device of the user, a selection of one of the selectable image elements representing a fashion trend; and
in response to receiving the selection, causing presentation of a second user interface of the plurality of pre-generated fashion trend user interfaces that presents the selected fashion trend, the second user interface comprising a picture corresponding to the selected fashion trend and images of the matching available inventory items that match the fashion items in the picture corresponding to the selected fashion trend.

13. The system of claim 12, wherein:
the fashion trend user interface comprises an interactive map of the world, and the selectable image elements represent regions in the world;
the receiving the selection of one of the selectable image elements comprises receiving a selection of a region on the interactive map; and
the causing presentation of the second user interface comprises causing presentation of a picture corresponding to the fashion trend for the selected region and the images of the matching available inventory items for the selected region.

14. The system of claim 11, wherein the external sources providing the fashion trend information comprises Twitter feeds containing trending location data.

15. The system of claim 13, wherein the operations further comprise accessing sales data for each of the regions, wherein the determining the one or more top fashion trends for each of the regions includes using the sales data in performing the determining.

16. The system of claim 12, wherein:
the selectable image elements represent top bloggers in the one or more regions, the top bloggers each providing the plurality of top fashion trends;
the receiving the selection of one of the selectable image elements comprises receiving a selection of one of the top bloggers; and
the causing presentation of the second user interface comprises causing presentation of a picture associated with the selected top blogger and the images of the matching available inventory items associated with the top blogger.

17. The system of claim 11, wherein the external sources providing the fashion trend information comprises social media posts posted by top bloggers.

18. The system of claim 12, wherein:
the selectable image elements represent runway shows;
the receiving the selection of one of the selectable image elements comprises receiving a selection of one of the runway shows; and
the causing presentation of the second user interface comprises causing presentation of a picture associated with the selected runway show and the images of the matching available inventory associated with the selected runway show.

19. The system of claim 12, wherein the causing the presentation of the second user interface comprises:
determining whether to update the second user interface of the plurality of pre-generated fashion trend user interfaces previously stored in the storage device; and
based on a determination to update, updating a stored version of the second user interface.

20. A machine-readable storage medium storing instructions that, when executed by one or more processors of a machine, cause the one or more processors to perform operations comprising:
accessing, from external sources, fashion trend information, the fashion trend information including pictures illustrating fashion trends;
determining a plurality of top fashion trends from the fashion trend information;
based on the determining, extracting, using an edge detection algorithm, images of fashion items from at least one of the pictures from the fashion trend information for each of the top fashion trends;
using the extracted images of the fashion items extracted from at least one of the pictures from the fashion trend information using the edge detection algorithm, performing, by the machine, an image search for matching available inventory items;
generating a plurality of fashion trend user interfaces, the plurality of fashion trend user interfaces each comprising selectable image elements that represent the plurality of top fashion trends, the plurality of fashion trend user interfaces being a plurality of pre-generated fashion trend user interfaces for use during runtime;
storing, in a storage device, the plurality of pre-generated fashion trend user interfaces for immediate availability during runtime, each of the plurality of pre-generated fashion trend user interfaces including at least one picture associated with one or more of the plurality of top fashion trends, at least some of the plurality of pre-generated fashion trend user interfaces including data corresponding to the matching available inventory items;
receiving, from a user at runtime, an indication to initiate a search for fashion by trends;
in response to receiving the indication, accessing the plurality of pre-generated fashion trend user interfaces and retrieving one of the plurality of pre-generated fashion trend user interfaces for presentation; and
causing presentation, on a device of the user, of the retrieved one of the plurality of pre-generated fashion trend user interfaces.

* * * * *